United States Patent
Gross et al.

(10) Patent No.: US 7,020,802 B2
(45) Date of Patent: Mar. 28, 2006

(54) METHOD AND APPARATUS FOR MONITORING AND RECORDING COMPUTER SYSTEM PERFORMANCE PARAMETERS

(75) Inventors: Kenny C. Gross, San Diego, CA (US); Larry G. Votta, Jr., Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 645 days.

(21) Appl. No.: 10/272,680

(22) Filed: Oct. 17, 2002

(65) Prior Publication Data

US 2004/0078723 A1  Apr. 22, 2004

(51) Int. Cl.
*G06F 11/00* (2006.01)

(52) U.S. Cl. .............................. 714/39; 714/37; 714/47

(58) Field of Classification Search ................... 714/37, 714/39, 47

See application file for complete search history.

(56) References Cited

U.S. PATENT DOCUMENTS

| | | | | |
|---|---|---|---|---|
| 3,818,458 A | * | 6/1974 | Deese | 714/47 |
| 5,682,328 A | * | 10/1997 | Roeber et al. | 702/187 |
| 5,991,708 A | * | 11/1999 | Levine et al. | 702/186 |
| 6,148,338 A | * | 11/2000 | Lachelt et al. | 709/224 |
| 6,223,148 B1 | * | 4/2001 | Stewart et al. | 703/25 |
| 6,269,412 B1 | * | 7/2001 | Liu et al. | 710/19 |
| 6,874,105 B1 | * | 3/2005 | Buechner et al. | 714/39 |

* cited by examiner

*Primary Examiner*—Robert Beausoliel
*Assistant Examiner*—Michael Maskulinski
(74) *Attorney, Agent, or Firm*—Park, Vaughan & Fleming LLP; Edward J. Grundler

(57) ABSTRACT

One embodiment of the present invention provides a system that systematically monitors and records performance parameters for a computer system. During operation, the system periodically measures values for a set of performance parameters associated with the computer system while the computer system continues operating. The system then records the values on a data storage device, wherein the recording process keeps track of temporal relationships between events in different performance parameters. The system subsequently allows the recorded values for the set of performance parameters to be analyzed.

21 Claims, 3 Drawing Sheets

METHOD AND APPARATUS FOR MONITORING AND RECORDING COMPUTER SYSTEM PERFORMANCE PARAMETERS

BACKGROUND

1. Field of the Invention

The present invention relates to systems for enhancing reliability within computer systems. More specifically, the present invention relates to a method and an apparatus for systematically monitoring and recording performance parameters within a computer system to enhance availability, quality of service and/or security.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems it is necessary to be able to capture unambiguous diagnostic information that can quickly pinpoint the source of defects in hardware or software. If systems have too little event monitoring, when problems crop up at a customer site, service engineers may be unable to quickly identify the source of the problem. This can lead to increased down time, which can adversely impact customer satisfaction and loyalty.

One approach to address this problem is to monitor all aspects of a customer's data center and to send the monitored signals to a central monitoring center. This enables monitoring center personnel to identify problematic discrepancies in system performance parameters and to direct service personnel more efficiently. This remote monitoring approach is currently being employed, but at a high cost and with only limited success.

One of the challenges of remote monitoring is to provide adequate infrastructure to channel the enormous volume of information to a finite number of humans in a remote monitoring center. Note that each server can potentially have several hundred monitored variables, and many customers have several hundred servers. Hence, with thousands of customer sites, it is an extremely challenging task to provide intelligent filtering at remote monitoring centers to analyze data and recognize anomalies with an acceptably low false alarm rate.

What is needed is a method and an apparatus for capturing diagnostic information to enhance system availability without the above-described problems.

SUMMARY

One embodiment of the present invention provides a system that systematically monitors and records performance parameters for a computer system. During operation, the system periodically measures values for a set of performance parameters associated with the computer system while the computer system continues operating. The system then records the values on a data storage device, wherein the recording process keeps track of temporal relationships between events in different performance parameters. The system subsequently allows the recorded values to be analyzed.

In a variation on this embodiment, recording the values involves storing the values in a circular file, wherein if the circular file is full, new incoming values overwrite the oldest existing values in the circular file.

In a further variation, the circular file has a dual-stage structure, including a first stage that maintains fine-grain, high-sampling rate data for the set of performance parameters over a preceding first time window, and a second stage that stores ensemble averages of data from the first stage over a preceding second time window, wherein the second time window is larger that the first time window.

In a further variation, if the system detects an anomaly in one or more of the performance parameters, the system freezes a state of the circular file in persistent storage while the computer system continues operating. The system then transmits the frozen state of the circular file to an analyst, who may be located at a remote monitoring center.

In a variation on this embodiment, detecting the anomaly can involve using, a threshold limit test on one or more performance parameters, an automated data mining and pattern recognition agent, a soft error rate discriminator (SERD), a sequential probability ratio test (SPRT), a multivariate state estimation technique (MSET), a signature analysis mechanism for intrusion detection, and a neural network.

In a variation on this embodiment, the computer system is comprised of a plurality of field replaceable units (FRUs). In this variation, the process of recording the values involves recording events for each FRU in local storage associated with each FRU.

In a variation on this embodiment, the set of performance parameters can include, internal performance parameters maintained by software within the computer system, physical performance parameters measured through sensors located in proximity to the computer system, and canary performance parameters associated with synthetic user transactions periodically generated for performance measuring purposes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
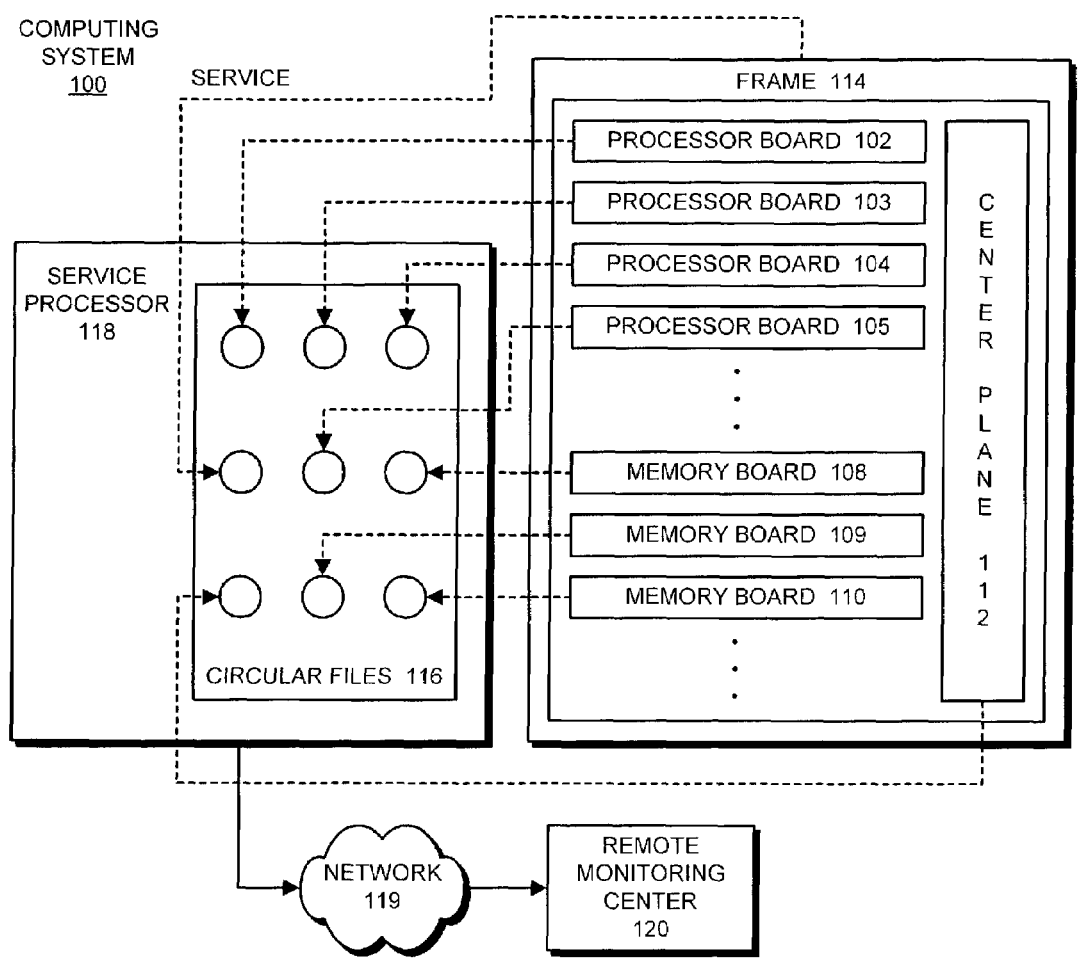
FIG. 1 illustrates a computer system in accordance with an embodiment of the present invention.

FIG. 1 illustrates a computer system 100 in accordance with an embodiment of the present invention. As is illustrated in FIG. 1, computer system 100 includes a number of processor boards 102–105 and a number of memory boards 108–110, which communicate with each other through center plane 112. These system components are all housed within a frame 114.

In one embodiment of the present invention, these system components and frame 114 are all field replaceable units (FRUs), which are independently monitored as is described below. Note that all major system units, including both hardware and software, can be decomposed into FRUs. For example, a software FRU can include, an operating system, a middleware component, a database, or an application.

Computer system 100 is associated with a service processor 118, which can be located within computer system 100, or alternatively can be located in a standalone unit separate from computer system 100. Service processor 118 performs a number of diagnostic functions for computer system 100. One of these diagnostic functions involves recording performance parameters from the various FRUs within computer system 100 into a set of circular files 116 located within service processor 118. In one embodiment of the present invention, there exists one dedicated circular file for each FRU within computer system 100. Note that this circular file can have a dual-stage structure as is described below with reference to FIG. 2.

The contents of one or more of these circular files 116 can be transferred across network 119 to remote monitoring center 120 for diagnostic purposes. Network 119 can generally include any type of wire or wireless communication channel capable of coupling together computing nodes. This includes, but is not limited to, a local area network, a wide area network, or a combination of networks. In one embodiment of the present invention, network 119 includes the Internet. Remote monitoring center 120 performs various diagnostic functions as is discussed below with reference to FIG. 2.

Although the present invention is described in the context of a server computer system 100 with multiple processor boards and an associated service processor 18. The present invention is not meant to be limited to such a server computer system. In general, the present invention can be applied to any type of computer system, with or without a service processor 118. This includes, but is not limited to, a computer system based on a microprocessor, a mainframe computer, a digital signal processor, a portable computing device, a personal organizer, a device controller, and a computational engine within an appliance.

Figure 2:
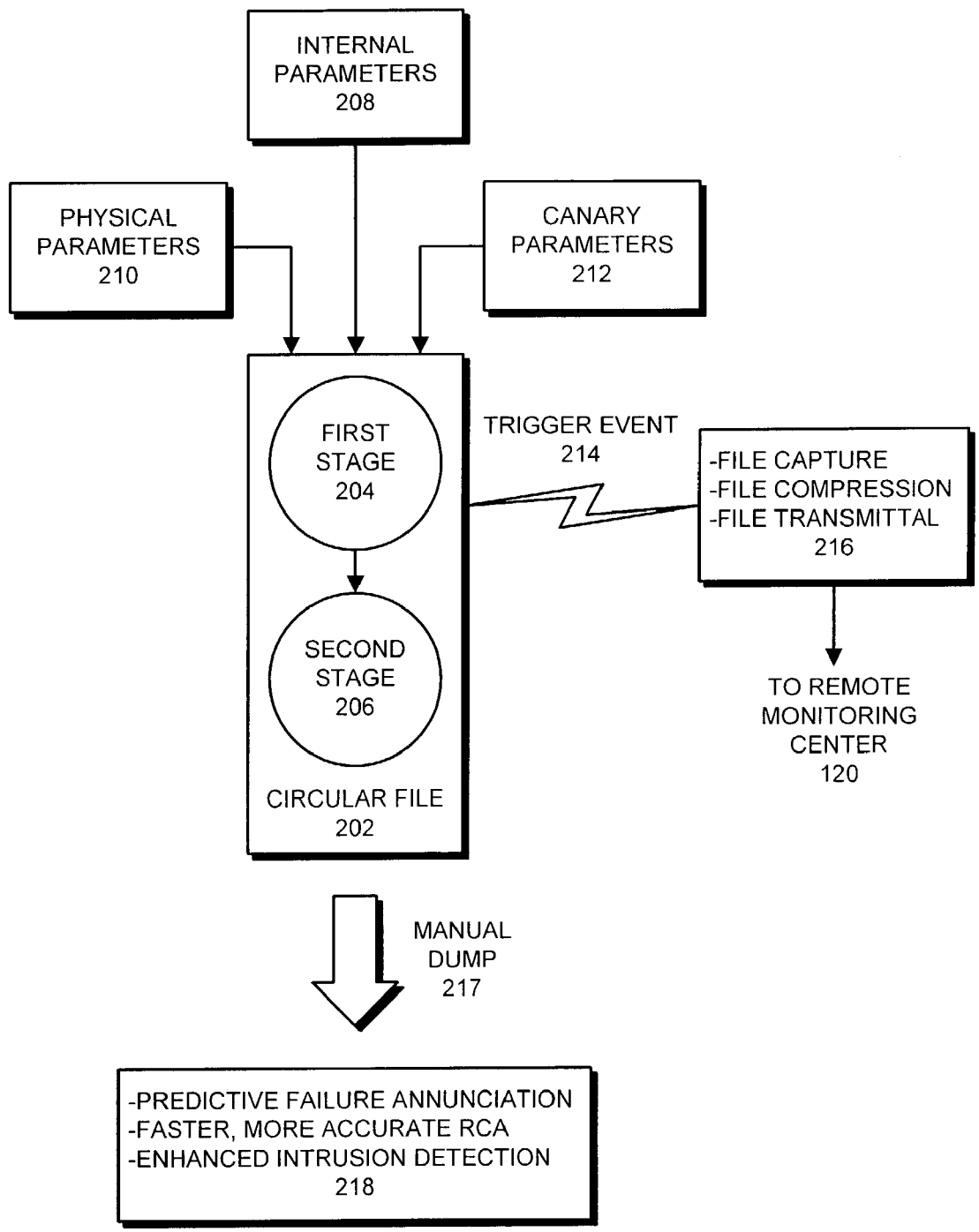
FIG. 2 illustrates the use of a circular file in a system that monitors and records performance parameters in accordance with an embodiment of the present invention.

Circular File present invention mitigates the challenges of large-scale remote monitoring schemes by providing a real-time telemetry architecture with a repository structured as a circular file 202 that acts as a system"black box" performance monitor (see FIG. 2)

Circular file 202 takes in a number of performance parameters, including internal parameters 208 maintained by software within the computer system. Internal parameters 208 can include system throughput, transaction latencies, queue lengths, load on the central processing unit, load on the memory, load on the cache, I/O traffic, bus saturation metrics, FIFO overflow statistics, and various operational profiles gathered through"virtual sensors" located within the operating system.

The performance parameters can also include physical parameters 210 measured through sensors located in proximity to the computer system. These physical parameters 210 can include distributed temperatures within the computer system, relative humidity, cumulative or differential vibrations within the computer system, fan speed, acoustic signals, current noise, voltage noise, time-domain reflectometry (TDR) readings, and miscellaneous environmental variables.

The performance parameters can additionally include canary parameters 212 associated with distributed synthetic user transactions periodically generated for performance measuring purposes. For example, canary parameters can include user wait times and other Quality Of Service (QOS) metrics measured during execution of distributed synthetic-user transactions.

In one embodiment of the present invention, circular file 202 has dual-stage structure. The first stage 204 contains fine-grain, high-sampling rate data for all monitored parameters. This high-density circular file holds, for example, only the last 72 hours worth of signals. Note that this 72-hour parameter can be adjusted by the customer. The second stage 206 contains ensemble averages of signals from the first stage 204, but retains data over a longer time period (for example, the most recent 30 days). Note that this dual-stage architecture retains the advantages of maintaining fine-grain information content for rapidly root causing acute problems, and coarser-grain long term information content for root causing more subtle problems, including software aging problems and some security problems whose signatures only become apparent over periods of days or possibly weeks.

During the time that systems are performing without any problems, the new incoming signals simply overwrite the previously recorded signals in circular file 202. An anomaly detected in any monitored variable becomes a triggering event 214, which causes the state of dual-stage circular file 202 to be automatically frozen (captured) into persistent memory. This frozen state is then compressed and transmitted to human analysts as is specified within box 216. Note that the process of detecting the anomaly can involve using, a threshold limit test on one or more performance parameters, an automated data mining and pattern recognition agent, a soft error rate discriminator (SERD), a sequential probability ratio test (SPRT), a multivariate state estimation technique (MSET), and a signature analysis mechanism for intrusion detection.

Alternatively, if an analyst wants to access the data for validation of new techniques, or for evaluating hypotheses about subtle phenomena that do not trip the anomaly thresholds, the analyst can cause a manual dump 217 of circular file 202 at any time. As is indicated within box 218, data gathered in this way can be used to provide, predictive failure annunciation, faster Root Cause Analysis (RCA) and enhanced intrusion detection.

The benefit of the above-described approach is that it facilitates enhancements to availability, serviceability, performance, capacity planning, quality of service, and security, without placing enormous burdens on the monitoring infrastructure during the majority of the time when systems are behaving without problems.

An auxiliary benefit is that improvements over current-"threshold limit" alarms that are deployed locally throughout large enterprise servers can be added in the form of smarter agents at the input side of the black box telemetry system.

A tertiary benefit comes from the fact that a sensor-operability validation mechanism can continuously sift through data within circular file 202 for proactive identification of sensors that have ceased functioning or have drifted out of calibration.

Enterprise computing systems (such as computer system 100 illustrated in FIG. 1) can contain many physical sensors deployed for the purpose of anomaly detection and asset protection. By placing threshold limit actuators on the signals from these sensors, it is possible to proactively shut down a domain or an entire server if an over-temperature event is detected. One problem in doing so is that the temperature sensors often have a shorter Mean Time Between Failures (MTBF) than the assets they are designed to protect. If such sensors"fail stupid" (meaning they retain their last mean value, but are no longer responding to changes in temperature), then a server costing in excess of $1,000,000 may be damaged by a thermal event.

Even more likely, however, is that as the sensor eventually drifts out of calibration, in which case it may cause a domain or server to be unnecessarily shut down from a"false alarm" event. In one embodiment of the present invention, a Sequential Probability Ratio Test (SPRT) mechanism with a high sensitivity and a low compute cost continuously sifts signals associated with physical sensors in circular file 202 and"calls home" with an alarm when it detects the incipience or onset of sensor degradation or sensor de-calibration events.

Note that during the recording process, the system keeps track of temporal relationships between events in different performance parameters. This information is useful in performing a root cause analysis. Note that in order to show that an event A causes an event B, it is necessary to: (1) establish a correlation; (2) establish temporal precedence; (3) demonstrate that the correlation is non-spurious; and (4) identify a mechanism that explains how A causes B. By keeping track of the temporal relationships between events in different performance parameters, temporal precedence can be established between these events, which can help in establishing a root cause.

Note that simply maintaining log files of events for each performance parameters does not suffice to establish temporal relationships between events in different performance parameters, because these events will appear in different log files which are not temporally correlated with each other.

Process of Recording and Monitoring Performance Parameters

Figure 3:
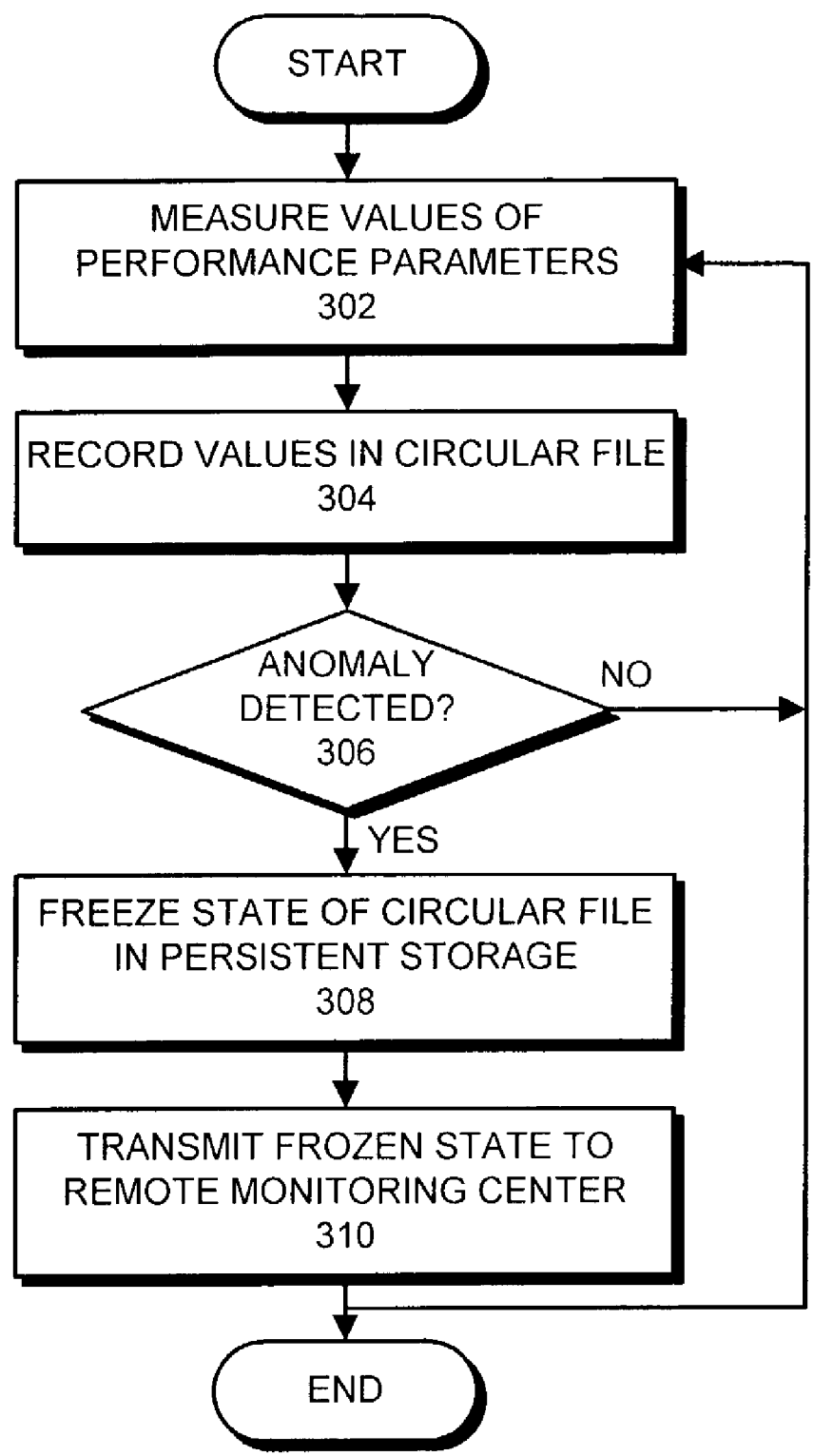
FIG. 3 is a flow chart illustrating the process of monitoring and recording values for performance parameters in accordance with an embodiment of the present invention.

FIG. 3 is a flow chart illustrating the process of monitoring and recording values for performance parameters in accordance with an embodiment of the present invention. The system starts by measuring values of the performance parameters of interest (step 302). Next, the system records the values in circular file 202 as is described above with reference to FIG. 2 (step 304). The system also tries to detect anomalies in the performance data (step 306). If no anomalies are detected, the system returns to step 302 to measure values for the performance parameters again. If one or more anomalies are detected, the system freezes the state of circular file 202 in persistent storage (step 308), and then transmits the frozen state to remote monitoring center 120 for further analysis (step 310).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for systematically monitoring and recording performance parameters for a computer system, comprising:
   periodically measuring values for a set of performance parameters associated with the computer system while the computer system continues operating, wherein the set of performance parameters can include:
      internal performance parameters maintained by software within the computer system,
      physical performance parameters measured through sensors located in proximity to the computer system, and
      canary performance parameters associated with synthetic user transactions periodically generated for performance measuring purposes;
   recording the values on a data storage device;
   wherein the recording process keeps track of temporal relationships between events in different performance parameters; and
   subsequently allowing the recorded values for the set of performance parameters to be analyzed.

2. The method of claim 1, wherein recording the values involves storing the values in a circular file, wherein if the circular file is full, new incoming values overwrite the oldest existing values in the circular file.

3. The method of claim 2, wherein the circular file has a dual-stage structure, including:
   a first stage that maintains fine-grain, high-sampling rate data for the set of performance parameters over a preceding first time window; and
   a second stage that stores ensemble averages of data from the first stage over a preceding second time window, wherein the second time window is larger that the first time window.

4. The method of claim 2, wherein subsequently allowing the recorded values for the set of performance parameters to be analyzed involves:
   detecting an anomaly in one or more of the performance parameters; and
   in response to the anomaly,
      freezing a state of the circular file in persistent storage while the computer systems continues operating, and
      transmitting the frozen state of the circular file to an analyst.

5. The method of claim 4, wherein transmitting the frozen state of the circular file to the analyst involves transmitting the frozen state to a remote monitoring center.

6. The method of claim 4, wherein detecting the anomaly can involve using:
   a threshold limit test on one or more performance parameters;
   an automated data mining and pattern recognition agent;

a soft error rate discriminator (SERD);
a sequential probability ratio test (SPRT);
a multivariate state estimation technique (MSET);
a signature analysis mechanism for intrusion detection; and
a neural network.

7. The method of claim 1,
wherein the computer system is comprised of a plurality of field replaceable units (FRUs); and
wherein recording the values involves recording events for each FRU in local storage associated with each FRU.

8. A computer-readable storage medium storing instructions that when executed by a computer cause the computer to perform a method for systematically monitoring and recording performance parameters for a computer system, wherein the computer-readable storage medium includes one of a volatile memory, a non-volatile memory, a disk drive, a magnetic tape, a compact disc, a digital versatile disk and a digital video disk, the method comprising:
    periodically measuring values for a set of performance parameters associated with the computer system while the computer system continues operating, wherein the set of performance parameters can include:
        internal performance parameters maintained by software within the computer system,
        physical performance parameters measured through sensors located in proximity to the computer system, and
        canary performance parameters associated with synthetic user transactions periodically generated for performance measuring purposes;
    recording the values on a data storage device;
    wherein the recording process keeps track of temporal relationships between events in different performance parameters; and
    subsequently allowing the recorded values for the set of performance parameters to be analyzed.

9. The computer-readable storage medium of claim 8, wherein recording the values involves storing the values in a circular file, wherein if the circular file is full, new incoming values overwrite the oldest existing values in the circular file.

10. The computer-readable storage medium of claim 9, wherein the circular file has a dual-stage structure, including:
    a first stage that maintains fine-grain, high-sampling rate data for the set of performance parameters over a preceding first time window; and
    a second stage that stores ensemble averages of data from the first stage over a preceding second time window, wherein the second time window is larger that the first time window.

11. The computer-readable storage medium of claim 9, wherein subsequently allowing the recorded values for the set of performance parameters to be analyzed involves:
    detecting an anomaly in one or more of the performance parameters; and
    in response to the anomaly,
        freezing a state of the circular file in persistent storage while the computer system continues operating, and transmitting the frozen state of the circular file to an analyst.

12. The computer-readable storage medium of claim 11, wherein transmitting the frozen state of the circular file to the analyst involves transmitting the frozen state to a remote monitoring center.

13. The computer-readable storage medium of claim 11, wherein detecting the anomaly can involve using:
    a threshold limit test on one or more performance parameters;
    an automated data mining and pattern recognition agent;
    a soft error rate discriminator (SERD);
    a sequential probability ratio test (SPRT);
    a multivariate state estimation technique (MSET);
    a signature analysis mechanism for intrusion detection; and
    a neural network.

14. The computer-readable storage medium of claim 8,
wherein the computer system is comprised of a plurality of field replaceable units (FRUs); and
wherein recording the values involves recording events for each FRU in local storage associated with each FRU.

15. An apparatus that systematically monitors and records performance parameters for a computer system, comprising:
    a measurement mechanism configured to periodically measure values for a set of performance parameters associated with the computer system while the computer system continues operating, wherein the set of performance parameters can include:
        internal performance parameters maintained by software within the computer system,
        physical performance parameters measured through sensors located in proximity to the computer system, and
        canary performance parameters associated with synthetic user transactions periodically generated for performance measuring purposes;
    a recording mechanism configured to record the values on a data storage device;
    wherein the recording mechanism keeps track of temporal relationships between events in different performance parameters; and
    an analysis mechanism configured to allow the recorded values for the set of performance parameters to be analyzed.

16. The apparatus of claim 15, wherein the recording mechanism is configured to store the values in a circular file, wherein if the circular file is full, new incoming values overwrite the oldest existing values in the circular file.

17. The apparatus of claim 16, wherein the circular file has a dual-stage structure, including:
    a first stage that maintains fine-grain, high-sampling rate data for the set of performance parameters over a preceding first time window; and
    a second stage that stores ensemble averages of data from the first stage over a preceding second time window, wherein the second time window is larger that the first time window.

18. The apparatus of claim 16, wherein the analysis mechanism is configured to:
    detect an anomaly in one or more of the performance parameters; and
    in response to the anomaly, to
        freeze a state of the circular file in persistent storage while the computer system continues operating, and to
        transmit the frozen state of the circular file to an analyst.

19. The apparatus of claim 18, wherein the analyst is located at
a remote monitoring center.

20. The apparatus of claim 18, wherein the measuring mechanism can be configured to use:
   a threshold limit test on one or more performance parameters;
   an automated data mining and pattern recognition agent;
   a soft error rate discriminator (SERD);
   a sequential probability ratio test (SPRT);
   a multivariate state estimation technique (MSET);
   a signature analysis mechanism for intrusion detection; and
   a neural network.

21. The apparatus of claim 15,
   wherein the computer system is comprised of a plurality of field replaceable units (FRUs); and
   wherein the recording mechanism is configured to record events for each FRU in local storage associated with each FRU.

* * * * *